US012568962B2

(12) United States Patent
Dreben et al.

(10) Patent No.: US 12,568,962 B2
(45) Date of Patent: *Mar. 10, 2026

(54) ADDITIVE INGREDIENTS OF SYNERGISTS AND SURFACTANTS PROVIDED IN A SINGLE-USE TRANSPORTER PREFERABLY FOR USE WITH WEED CONTROL, INSECT CONTROL AND MOLD REMOVAL COMPOSITIONS

(71) Applicant: ECOSAVEEARTH, INC., Lake Worth, FL (US)

(72) Inventors: Jeffrey I. Dreben, Palm Beach, FL (US); Alexander C. Tilt, Delray Beach, FL (US)

(73) Assignee: ECOSAVEEARTH, INC., Lake Worth, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/955,005

(22) Filed: Nov. 21, 2024

(65) Prior Publication Data

US 2025/0081962 A1 Mar. 13, 2025

Related U.S. Application Data

(62) Division of application No. 18/600,631, filed on Mar. 8, 2024, now Pat. No. 12,161,113.

(60) Provisional application No. 63/451,303, filed on Mar. 10, 2023.

(51) Int. Cl.

| | |
|---|---|
| A01N 25/34 | (2006.01) |
| A01N 25/02 | (2006.01) |
| A01N 25/30 | (2006.01) |
| A01N 37/02 | (2006.01) |
| A01N 37/06 | (2006.01) |
| A01N 65/16 | (2009.01) |
| A01N 65/34 | (2009.01) |
| A01P 3/00 | (2006.01) |
| A01P 7/04 | (2006.01) |
| A01P 13/00 | (2006.01) |

(52) U.S. Cl.
CPC ............. *A01N 25/34* (2013.01); *A01N 25/02* (2013.01); *A01N 25/30* (2013.01); *A01N 37/02* (2013.01); *A01N 37/06* (2013.01); *A01N 65/16* (2013.01); *A01N 65/34* (2013.01); *A01P 3/00* (2021.08); *A01P 7/04* (2021.08); *A01P 13/00* (2021.08)

(58) Field of Classification Search
CPC ........ A01N 37/36; A01N 37/06; A01N 65/34; A01N 65/16
See application file for complete search history.

(56) References Cited

U.S. PATENT DOCUMENTS

| | | | |
|---|---|---|---|
| 2006/0134040 A1* | 6/2006 | Glassel ................. | A01N 65/06 424/70.1 |
| 2023/0042086 A1* | 2/2023 | Calderas ............... | A01N 25/04 |
| 2023/0137223 A1* | 5/2023 | Huber ................... | A01N 31/02 424/739 |

OTHER PUBLICATIONS

WeedKleen Product label, retrieved from http://ecosaveearth.com/shop; retrieved on Jul. 16, 2024.*
WeedKleen (TM) webpage, archived Jul. 2, 2016, <https://ecosaveearth.com/shop>; retrieved on Jul. 27, 2024.*
WeedKleen (TM) webpage, archived Oct. 26, 2020, <https://ecosaveearth.com/shop>; retrieved on Jul. 27, 2024.*
Machine translation of KR 102453553 (Oct. 14, 2022).*

* cited by examiner

*Primary Examiner* — John Pak
(74) *Attorney, Agent, or Firm* — DANIEL S. POLLEY, PA

(57) ABSTRACT

An additive transporter, housing additive ingredients of synergists and surfactants preferably for use in a natural, weed control application, insect control application, algae removal and/or mold removal end-use application. In certain non-limiting embodiments, the transporter can be fluid soluble. Where the transporter is fluid soluble it can be added to a container/bottle having a desired amount of water and organic acid or inorganic acid causing the transporter to dissolve and release the additive ingredients for mixing with the water and organic acid. Preferably, the additive or product enhancer ingredients can be organic ingredients and can comprise, without limitation, citric acid, potassium oleate, wintergreen oil and almond oil. Potassium citrate can also be included. As the transporter dissolves the released ingredients mix with organic acids and/or inorganic acids to provide an end-use composition for eco-friendly weed control, insect control, algae removal and/or mold removal. Though not considered limiting, the transporter can be in the form of a pod, packet, pouch, capsule, carton, or cardboard/plastic/metal container.

16 Claims, 1 Drawing Sheet

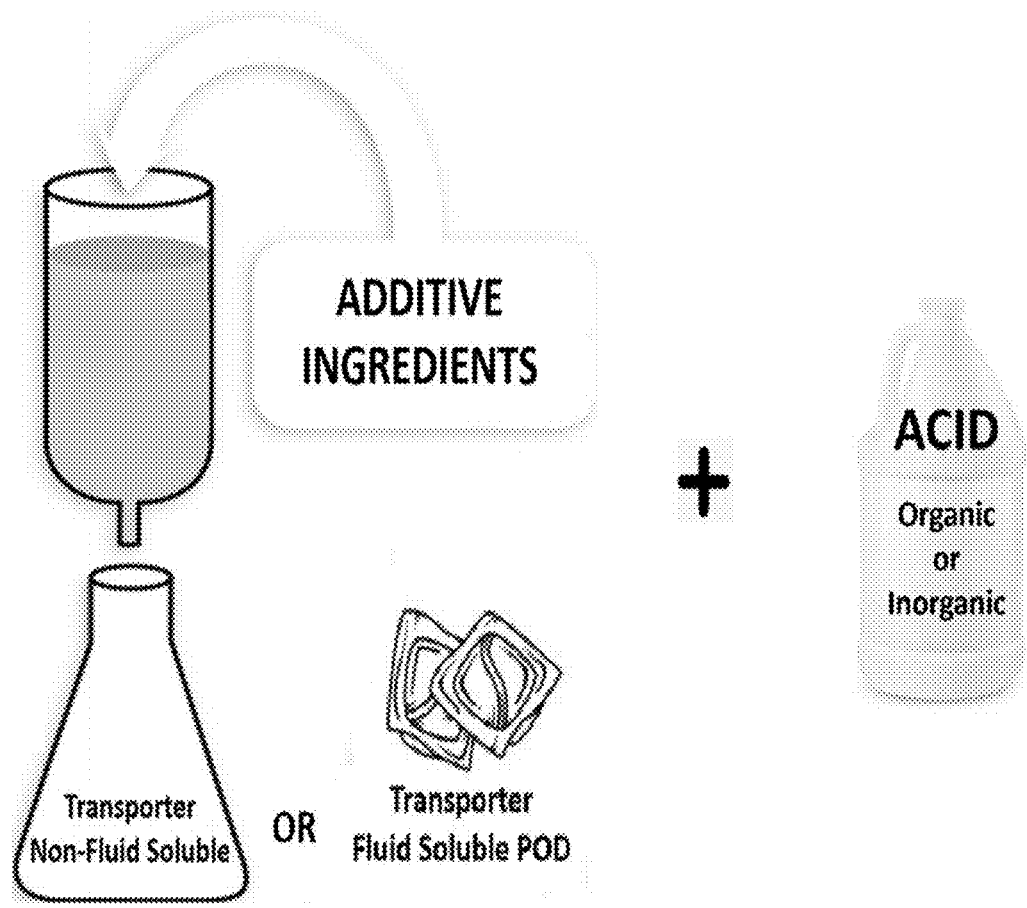

ADDITIVE INGREDIENTS OF SYNERGISTS AND SURFACTANTS PROVIDED IN A SINGLE-USE TRANSPORTER PREFERABLY FOR USE WITH WEED CONTROL, INSECT CONTROL AND MOLD REMOVAL COMPOSITIONS

This application is a divisional of application Ser. No. 18/600,631, filed Mar. 8, 2024, which claims the benefit of and priority to U.S. Provisional Patent Application Ser. No. 63/451,303, filed Mar. 10, 2023. Both applications are incorporated by reference in their entireties for all purposes.

1. FIELD OF THE DISCLOSURE

The disclosure relates generally to additives for weed control, insect control, algae removal and mold removal compositions and more particularly to the "prior to use" housing of an additive for weed control, insect control, algae removal and mold removal compositions.

2. BACKGROUND

Those whose activities or professions may rely on regular use of chemical-based weed control, insect control, algae removal or mold removal products may be concerned about exposure to toxic weed control, insect control, algae removal and mold removers that could cause harm to humans and wildlife. In some scenarios, such as with homeowners and commercial landscapers, users of weed control, insect control, algae removal and mold removers may not understand the potential risks to personal health and the environment.

Existing weed control, insect control, algae removal and mold removal remedies suffer from several shortcomings, including unhealthy ingredients, toxic wastewater run-off, and wasteful use of plastic packaging that adversely impact the Earth's biodiversity and climate. Some weed control, insect control, algae removers and mold removers, even those not containing toxic chemicals, are nonetheless made with a high percentage by volume of water. Thus, many weed control, insect control, algae removal and mold removal compositions are manufactured, shipped and stored using plastic bottles and containers, the majority of which are not recycled after use and end up in landfills. Thus, the below described novel weed control, insect control, algae removal and mold removal additive and single-use transporter, as defined below, is directed to addressing or reducing one or more of the above shortcomings.

SUMMARY OF THE DISCLOSURE

The disclosure generally describes a novel additive of ingredients preferably housed, prior to use, within a single-use fluid soluble pod (i.e. similar to a single use laundry or dishwasher detergent pod), capsule form, pouches, pockets, cartons, or any other container (i.e. cardboard, metal, plastic or combination thereof) or suitable packaging (all of the forms for housing the ingredients collectively referred to as "transporter" hereafter and can include both fluid soluble transporters and non-fluid soluble transporters). When the fluid soluble transporter containing the additive of ingredients is mixed with organic or inorganic acids, such as, but not limited to, acetic or pelargonic acid (i.e. adding the contents of the fluid soluble transporter within a bottle/container containing the organic acid or inorganic acid), the ingredients within the transporter dissolve and are released and mixed with the organic acid to complete the weed control, insect control, algae remover and/or mold remover application. Similarly, where a non-fluid soluble transporter is used, the transporter is opened to permit the housed content (i.e. additive ingredients) to be poured into a bottle/container for mixing with the organic acid or inorganic acid. The below description will primarily discuss fluid soluble transporters, but it is also within the scope of the disclosure to use or substitute a non-fluid soluble transporter in place of the discussed fluid soluble transporter.

As the organic acid/inorganic acid portion of the weed control, insect control, algae remover and/or mold remover composition can be provided at the place of intended use, the additive ingredients for the compositions can be housed, stored and shipped without the use of plastic packaging/bottle/container to help reduce the negative impact on the Earth's biodiversity and climate.

By removing most of the water from the weed control, insect control, algae removal and mold removal additive, the use of resources to ship water in single-use plastic containers is eliminated to reduce their carbon footprint.

In one non-limiting embodiment, a single-use transporter housing the ingredients can be provided for mixing with organic acids and inorganic acids, such as, but not limited to, acetic or pelargonic acid to provide a weed control, insect control, algae removal and/or mold removal application.

In one non-limiting embodiment, the composition contained within the single-use transporter can comprise citric acid, potassium oleate (which may or may not be partially dissolved in a small amount of water), wintergreen oil and almond oil and collectively can be virtually 100% by weight of the final composition of the additive ingredients within the transporter (hereinafter "final composition") and are ultimately mixed with the organic and/or inorganic acid and can also be mixed with water. In one non-limiting embodiment, preferably the single-use transporter containing the ingredients is placed within a fluid comprising of organic acid and/or inorganic acid and water, which causes the ingredients to mix together and release the ingredients for mixture with the organic acid and water. Though not limiting, organic acid and/or inorganic acid can preferably be acetic acid or a fatty acid. The end-use composition when mixed provides for an effective, preferably non-toxic (though not limiting) application for controlling all types of weeds as but one non-limiting use for the end-use composition. The preferred composition can also include an amount of potassium citrate.

In a preferred embodiment, the ingredients selected for delivery through the transporter act as a surfactant and synergist for the organic acid and/or inorganic acid to allow the organic acid and/or inorganic acid to stay in contact with the vegetation, insects, algae and/or mold surface long enough to effectively destroy or break down the cellular structure of any form of vegetation, insect, algae and/or mold. Thus, the transporter delivers the ingredients (i.e. additive/enhancer) for mixing by the user with acetic acid or other acids, such as, but not limited to, pelargonic acid and/or various other acids (organic and/or inorganic) known for their use in weed, mold, algae and/or insect control.

The use of the transporter containing the synergistic/surfactant ingredients should allow the end user to use relatively much lower and safer levels of acid PHs (concentration levels), while still obtaining very good efficacy. The preferred additive ingredients contained within the transporter (i.e. when mixed with the acids [i.e. transporter is dissolved or opened]) cause the ingredients to act as a surfactant and synergist to allow the acid to stay in contact with the vegetation or mold long enough to effectively break down the cellular structure.

Once the end-use composition has been mixed together, the efficacy of the composition can be found by the synergistic effect of the synergists, surfactants and organic and/or inorganic acids which can break down the cellular structure without the need for toxic chemicals that can cause harm to people, pets and pollinators.

Preferably, in all of the above-described embodiments, the organic acid (i.e. such as, but not limited to vinegar or acetic acid) or inorganic acid can be separate and distinct from the transporter prior to use, and thus, the organic acid and/or inorganic acid and water does not have to be shipped along with the transporter. Additionally, as the transporter is used for housing, storing and shipping the ingredients prior to use and without the need to have the ingredients mixed with the organic acid and/or inorganic acid at the time of shipping, the novel device disclosed herein eliminates or significantly reduces the need for shipping water in a plastic bottle, thus providing additional environmental benefits.

Though the ingredients provided within the transporter can be preferably "natural" ingredients, the disclosure is not considered limited to using only "natural" ingredients, and it is considered within the scope of the disclosure that other "non-natural" ingredients for a weed control, garden maintenance, yard maintenance, insect control, mold removal, algae removal, etc. can also be housed within the transporter and are also considered within the scope of the disclosure.

Additionally, though the disclosed additive ingredients composition is described as being preferably used for weed control, insect control, algae removal and mold removal applications, such is not considered limiting, and it is also within the scope of the disclosure that the composition can be used for other purposes in addition to weed control, insect control, algae removal and mold removal with such other uses also considered within the scope of the disclosure.

These and other features, aspects and advantages of the novel compositions and products described in this disclosure will become better understood with reference to the following description and claims.

BRIEF DESCRIPTION OF THE DRAWINGS

FIG. 1 illustrates a diagram of a first, but non-limiting, components, used in connection with controlling weeds, controlling insects, algae removal and mold removal in accordance with the present disclosure, showing either in use with a fluid soluble transporter or a non-fluid soluble transporter.

DETAILED DESCRIPTION

As mentioned above disclosed a novel approach for housing, storing and shipping the ingredients preferably, though not limiting, used for a weed control composition/application, insect control composition/application, algae removal composition/application and/or mold removal composition/application, where the transporter used for the ingredients is dissolved (i.e. fluid soluble transporter) within a chosen amount of an organic acid and/or inorganic acid and water which causes the transporter to be dissolved and release the ingredients for mixing with the organic acid and/or inorganic acid and water to yield or create the end-use application/composition for a weed control, insect control, algae removal and/or mold removal composition/application. In one non-limiting embodiment, the organic acid and/or inorganic acid can be acetic acid (such as, but not limited to vinegar) though other types of organic and/or inorganic acids can also be used and are considered within the scope of the disclosure. However, for purposes of this disclosure only and not in a limiting sense, acetic acid may be specifically identified as the organic acid and/or inorganic acid in one or more of the examples and in the instant disclosure. Also, as noted above and below, though one preferred use for the end-use application is as a weed control, insect control, algae removal application and/or mold removal application, the disclosure is not considered limited to such, and the general concepts of housing, storing and/or shipping one or more of the ingredients within a transporter (as defined above) where the transporter is dissolved within a fluid or manually opened for mixing with other ingredients in an end-use application/composition is also considered to be included within the scope of the disclosure.

Thus, in some non-limiting embodiments, the ingredients described herein serve as an additive that once released by dissolving the transporter and mixing with the acetic acid and water create an end-use application that may be used as a weed control, insect control, algae removal and/or mold removal product. Though not limiting, the additive may be particularly useful in controlling weeds and insects and removing algae and mold and for protecting the health of homeowners, and other people whose occupation, hobby, or other activities rely significantly on the use of chemical products for such activities. The novel end-use application/composition created under the current disclosure provides the user a replacement from the use of toxic chemical products. As a non-limiting example, with the novel compositions disclosed herein, commercial pest control, algae remover, mold remover, commercial landscapers, etc. who are trained in the handling and use of pesticides and mold remover formulas may find that homeowners direct them to stop the use of chemical products, in favor of the use of the disclosed additive along with a concentration level that they prefer of organic acids (e.g. acetic acid, etc.) for a novel application to control most any infestation of weeds, insects, algae and/or mold.

Some of the ingredients for the disclosed additive may be provided in various liquid and/or solid forms. In some embodiments, the additive may be mixed or dissolved in water and an organic acid (such as, but not limited to acetic acid) and/or an inorganic acid. In some embodiments, the powdered form of the disclosed additive may be packaged in single-use, individual ingredient transporter.

In one non-limiting embodiment, the additive may comprise four primary components/ingredients: (1) potassium oleate, (2) citric acid, (3) almond oil, and (4) wintergreen oil. In another non-limiting embodiment, potassium citrate can also be included as a fifth ingredient along with ingredients (1)-(4). Though not considered limiting, each component/ingredient may be made from organic ingredients and may include substantially no or limited extraneous ingredients such as, but not limited to, preservatives and/or fillers. Depending on the use/application for the end-use composition, the ingredients for the additive may include additional components/ingredients or replacement ingredient(s) for one or more of the above identified preferred primary ingredients and all additional or replacement components/ingredients are considered within the scope of the disclosure.

In one preferred application, the single-use transporter housing the additive ingredients can be dissolved within liquids including water and an organic acid (e.g. acetic acid, etc.) and/or an inorganic acid, causing the transporter to dissolve and release the ingredients contained within the transporter and to mix with the organic acid and/or inorganic acid and water and to make or create the weed control, insect control, algae removal and/or mold removal application.

The exact components/materials that are used to create the transporter are not critical to the disclosure, and various materials/component/ingredients can be used. Though not limited to any specific materials, components, ingredients for manufacturing the transporter, the fluid soluble transporter preferably should not dissolve when coming into contact with any of the ingredients to be housed within the transporter or which may come into contact with the outer surface of the transporter, with the exception of being dissolvable when coming into contact with the organic acid and water.

In one specific, non-limiting embodiment (see below Table), the ingredients housed within the transporter can include potassium oleate, citric acid, almond oil and wintergreen oil. The Table illustrates non-limiting weight ranges (in ounces) for the ingredients. As noted above the oils, potassium oleate and citric acid preferably serve as a surfactant and synergist (i.e. increase the contact time in a homogeneous way of other ingredients which can be added to destroy and eliminate the cell structure of such things as all forms of vegetation, mold, algae and insects). The citric acid ingredient acts as synergist to increase the potency of any ingredient to which it is added as well as a preservative for the other ingredients in the formula.

TABLE I

| Ingredients | % of Total Weight |
|---|---|
| Potassium Oleate | 1-50 |
| Citric Acid | 2-40 |
| Almond Oil | .01-10 |
| Wintergreen Oil | .01-6 |
| Water | 10-50 |

As seen in FIG. 1, a non-limiting embodiment component schematic is shown and shows that the active ingredients can be provided in a non-fluid soluble transporter or a fluid soluble transporter for ultimate mixing with an organic acid or inorganic acid. Though not considered limiting, the end use application of the composition can be applied using a wide-mouth sprayer or other sprayer or another type of applicator and all are considered within the scope of the disclosure. In one non-limiting mixing process, the fluid soluble transporter (such as, without limitation, a pod) can be added into the sprayer already having acetic acid causing the transporter to dissolve and releases the synergists and surfactants which are mixed together with the acetic acid and water to form the end-use weed control, insect control, algae removal or mold removal composition/application. Thus, the acetic acid can be purchased separately by the user, thus allowing the synergist and surfactant ingredients to be shipped separately in the pod or other transporter. The surfactants and synergist shipped in the transporter, can be preferably selected to "supercharge" the user's acetic acid (i.e. store bought vinegar") and enable the acetic acid to better adhere to the surface of the weed, thus, helping to ensure effective burndown while naturally biodegrading into soil nutrients. The surfactants and synergists similarly allow the acetic acid to adhere to the surface of a weed or insect or algae or mold surface area.

Where the transporter is a pod, preferably any free or unsaturated water, if any, within the pod should not exceed 30% by weight of the total ingredients.

Naturally fermented household and horticultural acetic acid is being increasingly used by do-it yourself ("DIY") homeowners as a natural weed killer in place of chemical-based herbicides. As the acetic acid for the end-use application is provided by the user and can be mixed with the other ingredients preferably just prior to use, the amount of acetic acid used in the end-use application can be adjusted, such as, based on the user's needs.

As the transporters containing the synergists and surfactants are shipped, stored and sold separate from the acetic acid ingredient the transporter and its housed ingredients are not subject to any county, state, federal or country regulations or oversight, as commonly found with other toxic and non-toxic herbicides. The synergist and surfactant ingredients housed or contained within the transporter do not and cannot kill weeds or insects nor do they remove algae or mold. Rather, it is these ingredients interaction as a surfactant and synergist with the organic acids (e.g. acetic acid, etc.) and water that makes the end-use application effective and allows the ingredients to biodegrade into the soil nutrients or for their use in controlling insects and removing algae and mold.

Table 1 shows a first listing of preferred ingredients housed within the transporter, which in a non-limiting embodiment and non-limiting concentration, can be potassium oleate (concentration or amount between 1%-50% of the total weight of the additive composition within the transporter), almond oil (concentration or amount between 0.01%-10% of the total weight of the additive composition within the transporter), wintergreen oil (concentration or amount between. 0.01%-6% of the total weight of the additive composition within the transporter), and citric acid (concentration or amount between 2%-40% of the total weight of the additive composition within the transporter). All values falling within the ranges are considered within the scope of the disclosure and all ingredient combinations falling within the above noted range of concentrations or amounts are also considered within the scope of the disclosure without specifically listing every possible value and combination and all are considered incorporated by reference as if they were fully set forth or listed herein.

TABLE II

| Ingredients | % of Total Weight |
|---|---|
| Potassium Oleate | 1-50 |
| Citric Acid | 2-40 |
| Almond Oil | .01-10 |
| Wintergreen Oil | .01-6 |
| Potassium Citrate | 1-30 |
| Water | 10-50 |

Table 1I shows a second listing of preferred ingredients housed within the transporter, which in a non-limiting embodiment and non-limiting concentration, can be potassium oleate (concentration or amount between 1%-50% of the total weight of the additive composition within the transporter), almond oil (concentration or amount between 0.01%-10% of the total weight of the additive composition within the transporter), wintergreen oil (concentration or amount between. 0.01%-6% of the total weight of the additive composition within the transporter), citric acid (concentration or amount between 2%-40% of the total weight of the additive composition within the transporter), and potassium citrate (concentration or amount between 1%-30% of the total weight of the additive composition within the transporter). All values falling within the ranges are considered within the scope of the disclosure and all ingredient combinations falling within the above noted range of concentrations or amounts are also considered within the scope of the disclosure without specifically listing every possible value and combination and all are considered incorporated by reference as if they were fully set forth or listed herein.

For both Table I and Table II the water content preferably can be between 10% to 50% of the total weight of the additive composition within the transporter. All values falling within this range are considered within the scope of the disclosure without specifically listing every possible value and all are considered incorporated by reference as if they were fully set forth or listed herein.

The surfactant and synergist increase the contact time in a homogeneous way of other ingredients which are added to target the destruction and elimination of the cell structure of such things as all forms of vegetation, mold, algae and insects. Thus, when discussing weed control, insect control, algae removal and mold removal, it should be understood that weed control, insect control, algae removal and mold removal are just some preferred, non-limiting uses, and the above-disclosed novel transporter and its housed ingredients can be used for creating end-use compositions/applications for weed control, insect control, algae removal or mold removal, as well as for other uses, and all formulations incorporating a dissolvable transporter for providing some of the ingredients for the formulation are considered within the scope of the disclosure.

The internal space within the pod can also be sectioned/divided into one or more isolated internal spaces, so as to keep one or more of the ingredients separated from the remaining ingredients while the pod is being shipped, stored and used. Thus, the transporter can have multiple internal compartments, sections, chambers, etc. In one non-limiting embodiment, the housed citric acid can be separated from the remaining housed ingredients until the time the pod is dissolved and all ingredients, including the water and acetic acid, are mixed together. In other embodiment, each of the ingredients can be housed within a separate, isolated internal section within the pod. All internal configurations for the pod are considered within the scope of the disclosure.

Having now fully described the subject methods, compositions, and systems, it will be understood by those of ordinary skill in the art that the same can be performed within a wide and equivalent range of conditions, formulations, ingredient substitutions, and other parameters without affecting their scope or any embodiment thereof. All cited patents, patent applications, and publications, if any, are fully incorporated by reference in their entirety.

The present disclosure is described herein with reference to the accompanying drawing, which forms a part hereof, and which shows, by way of illustration, a specific exemplary, non-limiting, embodiment by which the disclosure may be practiced. This disclosure may, however, be embodied in many different forms and should not be construed as limited to the embodiments set forth herein; rather, these embodiments are provided so that this disclosure will be thorough and complete, and will fully convey the scope of the disclosure and invention to those skilled in the art. Among other things, novel aspects of the present invention and disclosure are embodied in both described methods and devices.

In addition, as used herein, the term "or" is an inclusive "or" operator and is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" include plural references. The meaning of "in" includes "in" and includes plural references. The meaning of "in" includes "in" and "on."

In view of the above, it will be seen that the several advantages of the disclosure can be achieved, and other advantageous results attained. As various changes could be made in the above compositions and methods without departing from the scope of the disclosure, it is intended that all matter contained in the above description and shown in any accompanying drawing shall be interpreted as illustrative and not in a limiting sense.

While various embodiments have been described above, it should be understood that such disclosures have been presented by way of example only and are not limiting. Thus, the breadth and scope of the subject methods, compositions, and systems should not be limited by any of the above-described exemplary embodiments.

Any measurements, values, amounts, ranges, volumes, dimensions, time values, temperatures, percentages, materials, transporter materials, transporter types, composition ingredients, additives, uses for the composition, methods of making, mixing procedures, heating procedures, etc. disclosed herein are provided by way of example and not considered limiting, and other measurements, values, amounts, ranges, volumes, dimensions, time values, temperatures, percentages, materials, transporter materials, composition ingredients, additives, transporter types, uses for the composition, methods of making, mixing procedures, heating procedures, etc. can be used and are considered within the scope of the disclosure. The disclosed compositions are not considered limited to the specific ingredients discussed herein and other ingredients can be substituted for certain ingredients, including, without limitation, ones that perform similar functions as purposes, and all substitutions are considered within the scope of the disclosure. Additionally, other ingredients may also be added to the composition and are also considered within the scope of the disclosure.

The exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form, details, ingredients, etc. may be made therein without departing from their spirit and scope of the disclosure.

What is claimed is:

1. An additive or product enhancer composition for weed control, insect control, mold removal and/or algae removal, the additive or product enhancer composition comprising:
    between 2-40% citric acid based on a total weight of the composition;
    between 1-50% potassium oleate based on the total weight of the composition;
    between 0.01-10% almond oil based on the total weight of the composition; and
    between 0.01-6% wintergreen oil based on the total weight of the composition.

2. The composition of claim 1 wherein the composition of citric acid, potassium oleate, almond oil and wintergreen is a surfactant and synergist composition for weed control, insect control, mold removal and/or algae removal.

3. The composition of claim 2 further comprising an organic or inorganic acid.

4. The composition of claim 3 wherein the organic acid or inorganic acid is pelargonic acid and the composition further comprises water.

5. The composition of claim 1 further comprising an amount of potassium citrate.

6. A product comprising a transporter housing the composition of claim 1 within the transporter.

7. The product of claim 6 wherein the transporter is fluid soluble.

8. A method of providing a weed control, insect control, mold removal and/or algae removal composition, comprising:

adding the product of claim 7 to a fluid comprising ingredients for weed control, insect control, mold removal and/or algae removal, wherein the transporter dissolves and releases the citric acid, potassium oleate, almond oil and wintergreen oil; and

mixing the released citric acid, potassium oleate, almond oil and wintergreen oil with the fluid to provide the weed control, insect control, mold removal and/or algae removal composition.

9. The method of claim 8 wherein the fluid comprises an organic or inorganic acid.

10. The method of claim 9 wherein the organic acid or inorganic acid is pelargonic acid.

11. The method of claim 8 wherein the fluid comprises pelargonic acid and water.

12. The method of claim 9 wherein the fluid further comprises water.

13. The product of claim 6 wherein the transporter is a pod, packet, pouch or capsule.

14. The product of claim 6 wherein the composition further comprising an amount of potassium citrate.

15. The product of claim 7 wherein the composition further comprising an amount of potassium citrate.

16. The method of claim 8 wherein the dissolving of the transporter also releasing an amount of potassium citrate that is mixed with the fluid.

*    *    *    *    *